United States Patent
Sick et al.

(10) Patent No.: US 11,808,884 B2
(45) Date of Patent: Nov. 7, 2023

(54) ADAPTIVE HIGH POINT NEIGHBORHOOD RANGE

(71) Applicant: ZF FRIEDRICHSHAFEN AG, Friedrichshafen (DE)

(72) Inventors: Benjamin Sick, Bodolz (DE); Stefan Zechner, Weißensberg (DE); Florian Engels, Wangen im Allgäu (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 306 days.

(21) Appl. No.: 17/075,761

(22) Filed: Oct. 21, 2020

(65) Prior Publication Data
US 2021/0116539 A1   Apr. 22, 2021

(51) Int. Cl.
  *G01S 7/41*    (2006.01)
  *G01S 13/58*   (2006.01)
  *G01S 13/93*   (2020.01)
  *G01S 7/35*    (2006.01)
  *G01S 13/931*  (2020.01)

(52) U.S. Cl.
  CPC ............ *G01S 7/412* (2013.01); *G01S 7/352* (2013.01); *G01S 7/415* (2013.01); *G01S 13/584* (2013.01); *G01S 13/931* (2013.01)

(58) Field of Classification Search
  CPC .......... G01S 7/412; G01S 7/352; G01S 7/415; G01S 13/584; G01S 13/931; G01S 13/42; G01S 7/2923; G01S 13/726; G01S 7/295; G01S 7/356
  See application file for complete search history.

(56) References Cited

U.S. PATENT DOCUMENTS

2010/0271257 A1* 10/2010 Hirogari .............. G01S 13/726
                                                342/107

OTHER PUBLICATIONS

T. Fei, C. Grimm, R. Farhoud, T. Breddermann, E. Warsitz and R. Hab-Umbach, "A novel target separation algorithm applied to the two-dimensional spectrum for FMCW automotive radar systems," 2017; pp. 1-6, doi: 10.1109/COMCAS.2017.8244791. (Year: 2017).*

(Continued)

*Primary Examiner* — Timothy A Brainard
*Assistant Examiner* — Juliana Cross
(74) *Attorney, Agent, or Firm* — TAROLLI, SUNDHEIM, COVELL & TUMMINO L.L.P.

(57) ABSTRACT

The present invention relates to a device (20) for determining a radar target list, comprising: an input interface (22) for receiving preprocessed sensor data from a radar sensor (18) with information on detected strengths at high points (H1, H2) in a distance and/or velocity dimension and in predefined neighborhood ranges of the high points in the distance and/or velocity dimension; an analysis unit (24) for determining mutually adjacent high points with overlapping neighborhood ranges based on the preprocessed sensor data; an adjustment unit (26) for adjusting the neighborhood ranges of the mutually adjacent high points; and an evaluation unit (28) for determining a radar target list with information on targets (17) in a field of view of the radar sensor based on the high points and the neighborhood ranges thereof. The present invention also relates to a method for determining a radar target list and a sensor system (10) for detecting targets (17) in an environment (12) of a vehicle (14).

10 Claims, 2 Drawing Sheets

(56) References Cited

OTHER PUBLICATIONS

Schoor, Michael & Yang, Bin. (2007). High-Resolution Angle Estimation for an Automotive FMCW Radar Sensor. (Year: 2007).*

Florian Engels et al. "Advances in Automotive Radar: A Framework On Computationally Efficient High-Resolution Frequency Estimation", pp. 1-10, IEEE Signal Processing Magazine 2017.

Michael Schoor and Bin Yang "High-Resolution Angle Estimation for an Automotive FMCW Radar Sensor" pp. 1-5, International Radar Symposium 2007.

Tai Fei et al. A Novel Target Separation Algorithm Applied To the Two-Dimensional Spectrum for FMCW Automotive Radar Systems, pp. 1-6, 2017 IEEE International Conference On Microwaves, Antennas, Communications and Electronic Systems, Nov. 2017.

\* cited by examiner

ADAPTIVE HIGH POINT NEIGHBORHOOD RANGE

RELATED APPLICATION

This application claims priority from German Application No. 10 2019 216 152.9, filed Oct. 21, 2019, the subject matter of which is incorporated herein by reference in its entirety.

BACKGROUND OF THE INVENTION

The present invention relates to a device for determining a radar target list. The present invention also relates to a sensor system for detecting targets in an environment of a vehicle and a method for determining a radar target list.

Modern vehicles (cars, vans, trucks, motorcycles, etc.) have a large number of sensors that provide the driver with information and control individual functions of the vehicle in a partially or fully automated manner. Sensors are used to detect the environment of the vehicle, and other road users. Based on the detected data, a model of the vehicle environment can be generated and changes in this vehicle environment can be reacted to.

Radar technology is an important sensor principle in this case. Most of the radar sensors used nowadays in the vehicle sector work as multi-pulse radar sensors (also referred to as chirp sequence radar sensors), in which several frequency-modulated pulses are emitted at short intervals. The radar sensors typically comprise several transmitting and receiving elements (antenna array) which form virtual channels of the radar sensor (Rx/Tx antenna pairs). In each receiving channel, downmixing in the baseband, filtering and then digitization of the thus obtained baseband signal are carried out. By preprocessing the baseband signals for each receiving channel, a target, i.e. an object, in a field of view of the radar sensor can be detected and located.

The preprocessing can in particular comprise a Fourier transform or optimal filtering of the baseband data for a single radar pulse (so-called fast-time processing), a further Fourier transform for several pulses (so-called slow-time processing), beamforming, signal strength detection, for example based on the constant force alarm rate method, and high point determination. A radar target list (also called a point cloud) can then be generated based on these preprocessed sensor data. This radar target list comprises the target parameters distance, radial or Doppler velocity and (if available) azimuth and elevation angles, and forms the basis for environment recognition.

There are several methods for determining high-resolution angles on elements of an antenna array based on phase differences of received signals. Examples are MUSIC, root-MUSIC or ESPRIT. Most maximum likelihood methods are complex to calculate in the spatial domain, but can be calculated efficiently in the frequency domain. Schoor et al., in "High-Resolution Angle Estimation for an Automotive FMCW Radar Sensor" describe applying algorithms for high-resolution angle estimation in a 77-gigahertz radar sensor in this connection. Engels et al., in "Advances in Automotive Radar: A framework on computationally efficient high-resolution frequency estimation" disclose a flexible approach to efficiently calculable high-resolution frequency estimation, based on a decoupled frequency estimation in the Fourier domain. The processing can be applied to the distance dimension, velocity dimension or angular dimension in this case.

Such approaches usually require several snapshots of a target capture in order to determine the covariance matrix of the signal. However, due to the sometimes rapid relative movements between the sensor and the target, this often cannot be reliably carried out, since an association of individual targets over several measuring cycles is not implemented within the signal processing and measured angles can also change significantly over several cycles. Another approach comprises considering cells adjacent to a high point in the distance-velocity range (neighborhood range or peak region). It is also possible to consider a neighborhood of the target in the distance-velocity-angle range in order to estimate high-resolution frequencies.

A disadvantage of additionally considering a neighborhood range when evaluating individual high points is that mutually adjacent targets in the distance-velocity range often influence one another. This can lead to inaccuracies or incorrect detections. Approaches which use two-target modeling result in significantly increased computational effort and can also lead to duplicated targets.

On this basis, the problem addressed by the present invention is that of providing an efficiently calculable and reliable approach for generating a radar target list. A high angular resolution should be made possible in the angular dimensions. Duplication of targets or other misdetections and the resulting inaccuracies should be avoided.

To solve this problem, a first aspect of the invention relates to a device for determining a radar target list, comprising:

an input interface for receiving preprocessed sensor data from a radar sensor with information on detected strengths in high points in a distance and/or velocity dimension and in predefined neighborhood ranges of the high points in the distance and/or velocity dimension;

an analysis unit for determining adjacent high points with overlapping neighborhood ranges based on the preprocessed sensor data;

an adjustment unit for adjusting the neighborhood ranges of the mutually adjacent high points; and an evaluation unit for determining a radar target list with information on targets in a field of view of the radar sensor based on the high points and the neighborhood ranges thereof.

Another aspect of the present invention relates to a sensor system for detecting targets in an environment of a vehicle, comprising:

a radar sensor for generating and preprocessing sensor data, the radar sensor preferably being designed as a frequency-modulated multi-pulse radar sensor; and a device as described above.

Further aspects of the invention relate to a method corresponding to the device described above and a computer program product having program code for executing the steps of the method when the program code is run on a computer, and a storage medium on which a computer program is stored, which computer program, when run on a computer, causes the method described herein to be carried out.

Preferred embodiments of the invention are described in the dependent claims. It should be understood that the features mentioned above and those yet to be explained below can be used not only in the particular specified combination, but also in other combinations or alone, without departing from the scope of the present invention. In particular, the sensor system, the method and the computer program product can be designed according to the embodiments described for the device in the dependent claims.

SUMMARY OF THE INVENTION

According to the invention, preprocessed sensor data from a radar sensor are received. In this case, the detected strengths in the distance and/or velocity dimension can be received for a receiving channel. It is also possible for only the detected strengths in high points and in the vicinity of high points (neighborhood range) to be received. It is first analyzed whether it can be determined based on the preprocessed sensor data that two high points have overlapping neighborhood ranges. The positions of the high points and the size of the predefined neighborhood ranges in particular can be analyzed for this purpose. According to the invention, neighborhood ranges of mutually adjacent high points with overlapping neighborhood ranges are adjusted. The determination of the radar target list is based on the high points and the adjusted neighborhood ranges thereof.

In contrast with previous approaches, according to the invention there is an additional step of adjusting neighborhood ranges of mutually adjacent high points before the target list is created. An identical neighborhood range is not considered for each high point in order to determine whether the high point is a single target or several targets. Rather, it is first checked whether, due to the influence of an adjacent high point, the neighborhood range of a high point could contain information which cannot be attributed to this adjacent high point. In order not to take into account incorrect information of this type, the neighborhood range is adjusted. Adjusting neighborhood ranges of mutually adjacent high points avoids reciprocal influences that could distort the results. The result is reliable recognition of targets and higher detection accuracy. The preceding adjustment of the neighborhood ranges can result in the determined radar target list having higher precision, for example in the angular dimensions.

In a preferred embodiment, the adjustment unit is designed to shorten the neighborhood ranges of the mutually adjacent high points, in each case in the direction of the other high point. The shortening is preferably limited by a predefined minimum length. Shortening should be understood to mean disregarding parts of the neighborhood range. The part of the neighborhood range of a high point which is closest to the other high point is not included in further processing. In this way, the strengths in this part of the neighborhood range are disregarded when determining whether there is a single target or multiple targets. The information in this part of the neighborhood range is more susceptible to errors. Errors in target recognition which can arise due to the influence of this part of the neighborhood range are therefore avoided by shortening the neighborhood range. The reliability in determining the radar target list is improved.

In a preferred embodiment, the adjustment unit is designed to adjust the neighborhood ranges of the mutually adjacent high points based on the detected strength in the other high point and/or its neighborhood range in each case. A higher detected strength in the other high point preferably results in greater shortening of the neighborhood range. It is possible to take into account the detected strength in the adjacent high point during the adjustment. If the adjacent high point is a very pronounced high point, a more significant adjustment can be made, for example by means of greater (more extensive) shortening. This further improves the reliability in recognizing the targets. Very pronounced high points in particular can result in major influence, and thus major errors.

In a preferred embodiment, the adjustment unit is designed to adjust the neighborhood ranges of the mutually adjacent high points based on a distance between the adjacent high points. A greater distance preferably results in greater shortening of the neighborhood ranges. High points that are very close to one another in particular result in strong reciprocal influences and can cause errors in the determination of the radar target list. By adjusting the neighborhood ranges based on the distance, the reliability in determining the radar target list can be improved. Errors and incorrect assignments are avoided.

In a preferred embodiment, the adjustment unit is designed to expand the neighborhood ranges of the mutually adjacent high points in a direction facing away from the other high point in each case. A size of the neighborhood range is preferably kept constant. In other words, it is possible for the adjustment of the neighborhood range to comprise a shift away from the other high point. Such a shift allows a size of the neighborhood range to be kept constant in order to allow efficient further calculation. The calculability can be improved.

In a preferred embodiment, the adjustment unit is designed to determine weighting factors for the neighborhood ranges of the mutually adjacent high points. The evaluation unit is designed to determine the radar target list based on the determined weighting factors. The adjustment can also comprise determining weighting factors. In particular, the parts of the neighborhood range of a high point which are closest to an adjacent high point can only be considered with a lower weighting during further processing in order to compensate for possible errors in this range. Individual cells are therefore considered with a lower weighting. The result is greater reliability in determining whether the high point is one target or several targets.

In a preferred embodiment, the input interface is designed to receive preprocessed sensor data with a high point list. For each high point, the high point list comprises a high point position, a high point strength and several surrounding strengths in the predefined neighborhood range of the high point. Since only one high point list is received, the amount of information to be transmitted is minimized. The result is efficient calculability.

In a preferred embodiment, the preprocessed sensor data comprise detected strengths in the distance and velocity dimensions. In particular, it is advantageous if a two-dimensional evaluation or a two-dimensional determination of the neighborhood range can be carried out in the distance and velocity dimensions. The neighborhood range can then comprise, for example, a side length of 3.5, 7 or 9 cells in the direction of the velocity dimension and in the direction of the distance dimension, the high point corresponding to the middle cell in each case. The reliable identification of targets based on the high point list results in improved resolution in the subsequent determination of the angles.

In a preferred embodiment, the preprocessed sensor data additionally comprise detected strengths in an azimuth and/or elevation dimension. It is possible to extend the method according to the invention to the azimuth and/or elevation dimension (angular dimensions). This results in further improved and more reliable detection of radar targets in the field of view of the sensor. The angular resolution can be improved.

In a preferred embodiment, the evaluation unit is designed to determine the radar target list based on a comparison of the high points and the neighborhood ranges thereof with a predefined model. In particular, a comparison with a model can be made for each high point in order to determine whether the high point is one target or several targets. The use of a comparison method results in efficient calculability and reliable target detection.

In a preferred embodiment, the evaluation unit is designed to determine the radar target list based on a MUSIC, root-MUSIC, ESPRIT or maximum likelihood approach. The approaches lead to precise determination of targets.

A radar sensor sends out a radar signal and receives reflections of the radar signal from objects (also referred to as targets) within a field of view of the radar sensor. An object can in particular be another vehicle, but also another road user (pedestrian, cyclist, etc.) or a stationary object (tree, house, road sign, etc.). The field of view describes an area within which objects can be detected. A radar sensor can comprise several individual sensors which, for example, allow a 360° all-around view and can thus record a complete image of the environment of a vehicle. Preprocessed sensor data refer to scanned baseband signals that have already been preprocessed. Preprocessing steps can in particular comprise optimal filtering or a Fourier transform of the scanned values per pulse and a Fourier transform over several pulses. Preprocessed sensor data can in particular comprise a two-dimensional indication of strengths in different cells in the direction of a distance and velocity dimension. In this respect, the sensor data can be in the form of a matrix and provide an image of the environment. It is also possible for only the high points and the neighborhood ranges thereof to be received in the form of a high point list. The amount of data to be transferred can be minimized in this way. A predefined neighborhood range should be understood in particular as an indication of a number of cells next to the cell or around the cell which corresponds to the high point. For example, the predefined neighborhood range in the distance and velocity dimensions can comprise two cells on both sides of the high point in each case. Overlapping neighborhood ranges are neighborhood ranges that comprise some of the same cells. Shortening of a neighborhood range should be understood to mean in particular deleting part of the neighborhood range or weighting part of the neighborhood range with a weight of zero.

BRIEF DESCRIPTION OF THE DRAWINGS

The invention is described and explained in more detail below with reference to selected embodiments and to the accompanying drawings, in which.

DESCRIPTION

Figure 1:
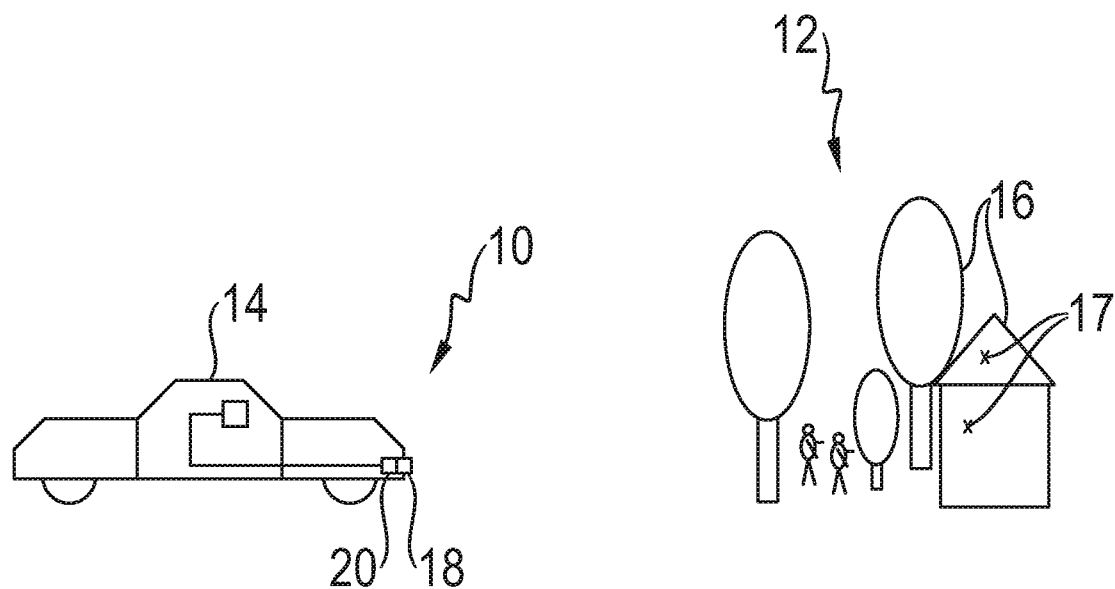
FIG. 1 is a schematic representation of a sensor system according to the invention in a vehicle.

A sensor system 10 according to the invention for detecting targets in an environment 12 of a vehicle 14 is shown schematically in FIG. 1. In the example shown, the sensor system 10 is an automotive radar system that is integrated into the vehicle 14. Objects 16 in the environment 12 of the vehicle can be detected as individual targets 17. It is also possible for a single object 16 to form multiple targets 17 in the radar target list.

The sensor system 10 comprises a radar sensor 18 and a device 20. The radar sensor 18 is preferably designed as a frequency-modulated multi-pulse radar sensor (FMCW radar sensor) and generates sensor data that image the environment 12 of the vehicle 14. A radar target list is determined in the device 20, which list can be used to generate an image of the environment, for example to allow autonomous operation of the vehicle 14 or to assist a driver.

Figure 2:
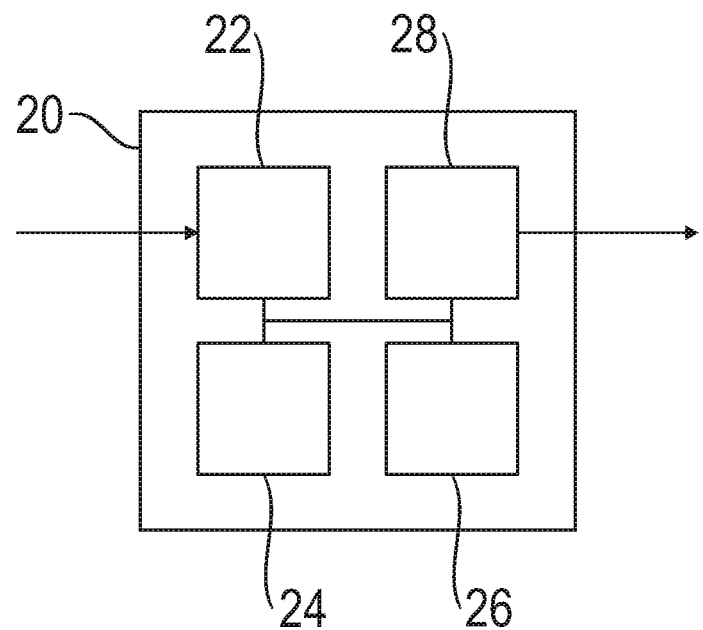
FIG. 2 is a representation of a device according to the invention.

The device 20 according to the invention is shown schematically in FIG. 2. The device 20 can in particular be integrated into the radar sensor. It is also possible for the device to be implemented as an additional module for the radar sensor or for a vehicle control unit. Furthermore, the device 20 can be implemented in software that is run by a processor of the radar sensor or by a processor of the vehicle control unit.

The device 20 comprises an input interface 22, an analysis unit 24, an adjustment unit 26 and an evaluation unit 28. The various units and interfaces can in particular be implemented individually or in combination or completely or partially in software and/or in hardware.

The input interface 22 is linked to a radar sensor and receives its data after raw data has been preprocessed within the multi-pulse radar sensor. In particular, the received preprocessed sensor data comprise information on detected strengths in high points in a distance and/or velocity dimension and in predefined neighborhood ranges of the high points in the distance and/or velocity dimension. It is possible for a high point list to be received directly. It is also possible for a complete distance and velocity matrix to be received, which shows not only the high points and the neighborhoods thereof, but also all other cells in the distance and velocity dimensions. In particular, the sensor data comprise strength information for various discrete cells in the distance dimension (cell size 1 meter, for example) and in the velocity dimension (can also be referred to as the Doppler dimension, cell size 0.5 meters per second, for example).

In the analysis unit 24, adjacent high points with overlapping neighborhood ranges are determined. For this purpose, the positions of the high points in the distance and velocity dimensions are considered, and it is determined whether the neighborhood range of two high points comprises some of the same cells. The analysis unit can in particular be designed to carry out a geometric evaluation.

If adjacent high points with overlapping neighborhood ranges have been determined, the neighborhood ranges of these adjacent high points are adjusted in the adjustment unit 26. In particular, at least one of the neighborhood ranges can be shortened. Shortening should be understood to mean discounting or disregarding the strength in at least one of the cells in the neighborhood range. Additionally or alternatively, it is also possible for a weighting of the cells in the overlapping range to be reduced.

Optionally, the adjustment unit 26 can be designed to carry out the adjustment based on the detected strength at the other high point in each case. In this case, a higher detected strength in the other high point can result in greater shortening being carried out in each case. It is also possible for a distance between the two adjacent high points to be taken into account when adjusting the neighborhood ranges. In particular, a smaller distance can result in greater shortening of the neighborhood range.

A radar target list with information on targets in a field of view of the radar sensor is then determined in the evaluation unit 28 based on the high points and the adjusted neighborhood ranges. For this purpose, the evaluation unit 28 can be designed, for example, to use a MUSIC, root-MUSIC, ESPRIT or maximum likelihood approach.

Figure 3:
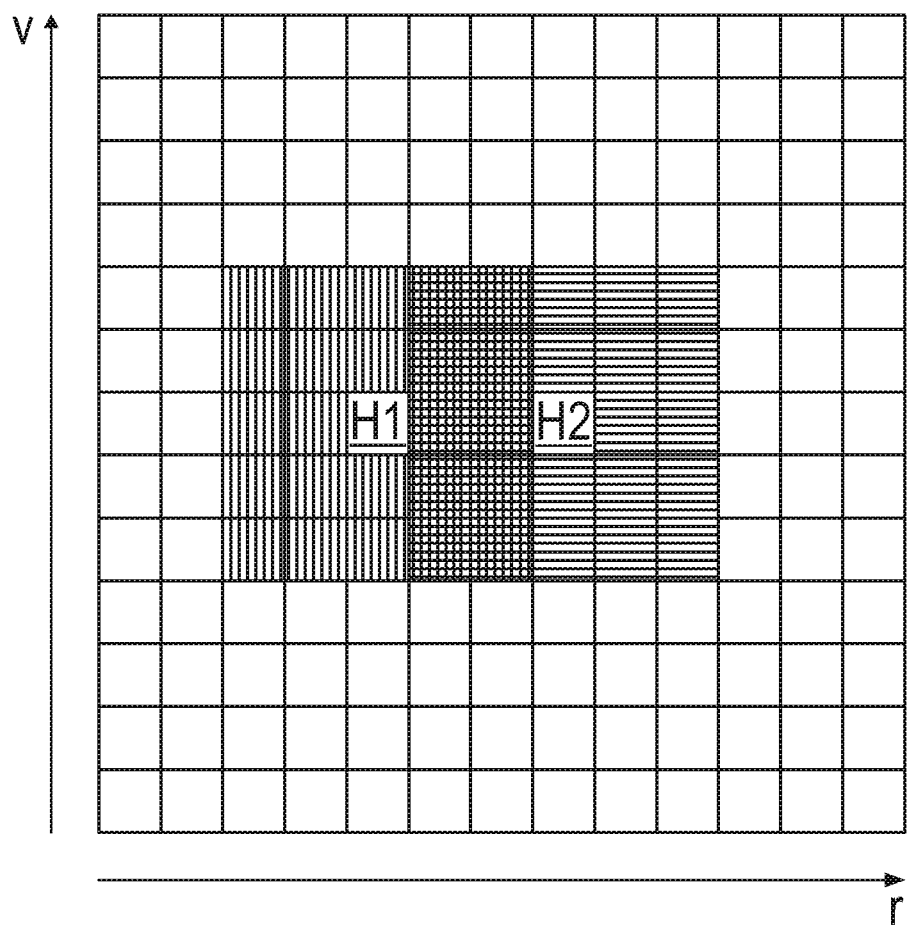
FIG. 3 is a schematic representation of an adjustment according to the invention of the neighborhood ranges of mutually adjacent high points.

A distance and velocity range is shown schematically in FIG. 3. The distance r between the sensor and the target is plotted on the x-axis, and a cell can correspond to one meter, for example. The relative angular velocity v of the target is plotted on the y-axis (Doppler), and a cell can correspond to a velocity of 0.5 m/s. In the example shown, the distance and velocity range has two high points H1, H2, which correspond to cells with high detected strengths (compared to their environment). The neighborhood range is five cells long in each of the distance and velocity dimensions. The neighborhood range of the high point H1 is marked with vertical lines. The neighborhood range of the high point H2 is marked with horizontal lines. Between the high points H1 and H2 are cells that belong to both neighborhood ranges and are marked with both vertical and horizontal lines.

In previous approaches to improving the angular resolution in automotive radar applications, the neighborhood range of high points in the distance and/or velocity range is considered and evaluated. In particular, modeling is used to determine whether the high point is a single target or whether several targets are represented as a single high point.

This can lead to errors and inaccuracies, especially if the neighborhood ranges partially overlap. If, for example, there are two targets at identical velocity and similar radar cross section with azimuth angles of +5° and −5°, which targets are three cells apart in the velocity dimension, inaccuracies in the determination of the radar target list can occur. First, the high points in the distance and velocity range would be correctly detected. If high-resolution angles were determined by means of a covariance matrix which is based on the neighborhood of a length of five cells, however, both targets would be detected in each case since the neighborhood ranges overlap by two cells each. Therefore, four targets at different combinations of distance and azimuth would arise from the actually existing two targets. If it is additionally assumed that the azimuth angle is also identical, two high points would in turn be detected in the distance, velocity and azimuth range. It would then be necessary to carry out a relatively complex test of a two-target hypothesis, since the other target is also present in the spectrum for both high points.

According to the invention, the neighborhood is considered when detecting the high point and, on this basis, an adaptive high point neighborhood range is determined. For this purpose, after high point detection, the neighborhood range for each high point is examined for an overlap with neighborhood ranges of other high points. If there are overlaps with another neighborhood range, the corresponding dimension is adjusted adaptively. In this case, the search takes place in its dimension. The adjustment can in particular comprise shortening the neighborhood range in the direction of the adjacent target. Shortening should be understood here to mean that the neighborhood range is reduced to the extent that the neighborhood range of the adjacent high point is no longer, or only to a reduced extent, in the other neighborhood range. As a result, information from the adjacent target that has already been resolved during high point detection is no longer taken into account in the further evaluation of the high point currently being examined, or is only taken into account to a reduced extent.

A corresponding example is shown in FIG. 3. If it is determined that the neighborhood ranges of the adjacent high points overlap, the neighborhood ranges are adjusted. In the example shown, the neighborhood range could be shortened by the ten overlapping cells during further processing and determination for the high point H1, for example. The ten cells marked with horizontal and vertical lines could therefore be disregarded in further processing or taken into account with reduced weighting. It is also possible for only the five cells closest to the other high point H2 to be disregarded.

Figure 4:
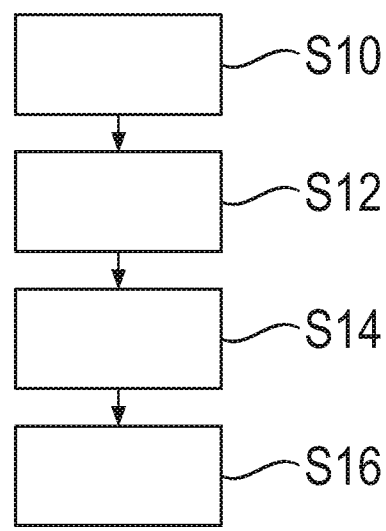
FIG. 4 is a schematic representation of a method according to the invention for determining a radar target list.

A method according to the invention for determining a radar target list is shown schematically in FIG. 4. The method comprises the steps of receipt S10 of preprocessed sensor data, determination S12 of mutually adjacent high points, adjustment S14 of neighborhood ranges and determination S16 of a radar target list. The method can be implemented as software that is run on a vehicle control unit, for example. The method is preferably implemented during normal operation of a radar sensor based on its current output.

The invention has been comprehensively described and explained with reference to the drawings and the description. The description and explanation are to be understood as examples, and should not be considered restrictive. The invention is not limited to the disclosed embodiments. Other embodiments or variations will become apparent to a person skilled in the art upon using the present invention and upon carefully analyzing the drawings, the disclosure and the following claims.

In the claims, the words "comprising" and "having" do not exclude the presence of further elements or steps. The undefined article "a" or "an" does not exclude the presence of a plurality. A single element or a single unit can perform the functions of several of the units mentioned in the patent claims. An element, a unit, an interface, a device and a system can be implemented partially or completely in hardware and/or in software. The mere mention of some measures in several different dependent claims should not be understood to mean that a combination of these measures cannot also be used advantageously. A computer program can be stored/distributed on a non-volatile data carrier, for example on an optical memory or on a solid-state drive (SSD). A computer program can be distributed together with hardware and/or as part of hardware, for example by means of the internet or by means of wired or wireless communication systems. Reference signs in the claims should not be understood as restrictive.

LIST OF REFERENCE SIGNS 10 sensor system
12 environment
14 vehicle
16 object
17 target
18 radar sensor
20 device
22 input interface
24 analysis unit
26 adjustment unit
28 evaluation unit

The invention claimed is:

1. A device (20) for determining a radar target list, comprising:
    a frequency-modulated multi-pulse radar sensor (18) for generating and preprocessing sensor data;
    an input interface (22) for receiving the preprocessed sensor data from the frequency-modulated multi-pulse radar sensor (18) with information on detected strengths in high points (H1, H2) in a distance and/or velocity dimension and in predefined neighborhood ranges of the high points in the distance and/or velocity dimension;

an analysis unit (24) for determining mutually adjacent high points with overlapping neighborhood ranges based on the preprocessed sensor data;

an adjustment unit (26) for adjusting the neighborhood ranges of the mutually adjacent high points, the adjustment unit (26) being designed to shorten the neighborhood ranges of the mutually adjacent high points (H1, H2) in the direction of the other high point in each case; and the shortening is limited by a predefined minimum length; and an evaluation unit (28) for determining a radar target list with information on targets (17) in a field of view of the frequency-modulated multi-pulse radar sensor based on the high points and the neighborhood ranges thereof.

2. The device (20) according to claim 1, wherein the adjustment unit (26) is designed to adjust the neighborhood ranges of the mutually adjacent high points (H1, H2) based on the detected strength in the other high point and/or the neighborhood range thereof in each case; and a higher detected strength in the other high point results in greater shortening of the neighborhood range.

3. The device (20) according to claim 1, wherein the adjustment unit (26) is designed to adjust the neighborhood ranges of the mutually adjacent high points (H1, H2) based on a distance between the adjacent high points; and a smaller distance results in greater shortening of the neighborhood ranges.

4. The device (20) according to claim 1, wherein the adjustment unit (26) is designed to expand the neighborhood ranges of the mutually adjacent high points (H1, H2) in a direction facing away from the other high point in each case; and a size of the neighborhood range is kept constant.

5. The device (20) according to claim 1, wherein the adjustment unit (26) is designed to determine weighting factors for the neighborhood ranges of the mutually adjacent high points (H1, H2); and the evaluation unit (28) is designed to determine the radar target list based on the determined weighting factors.

6. The device (20) according to claim 1, wherein the input interface (22) is designed to receive preprocessed sensor data with a high point list; and for each high point (H1, H2), the high point list comprises a high point position, a high point strength and several surrounding strengths in the predefined neighborhood range of the high point.

7. The device (20) according to claim 6, wherein the preprocessed sensor data comprise detected strengths in the distance and velocity dimensions.

8. The device (20) according to claim 7, wherein the preprocessed sensor data additionally comprise detected strengths in an azimuth and/or elevation dimension.

9. The device (20) according to claim 1, wherein the evaluation unit (28) is designed to determine the radar target list based on a comparison of the high points (H1, H2) and the neighborhood ranges thereof with a predefined model.

10. The device (20) according to claim 9, wherein the evaluation unit (28) is designed to determine the radar target list based on a MUSIC, root-MUSIC, ESPRIT or maximum likelihood approach.

* * * * *